(12) United States Patent
Yokota

(10) Patent No.: US 7,125,192 B2
(45) Date of Patent: Oct. 24, 2006

(54) JOINT

(75) Inventor: Yasunori Yokota, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 156 days.

(21) Appl. No.: 10/782,888

(22) Filed: Feb. 23, 2004

(65) Prior Publication Data

US 2004/0165941 A1   Aug. 26, 2004

(30) Foreign Application Priority Data

Feb. 21, 2003 (JP) ............................. 2003-043932

(51) Int. Cl.
*E16D 1/12* (2006.01)
(52) U.S. Cl. .................. 403/137; 403/133; 403/135
(58) Field of Classification Search ........ 403/122–144, 403/50, 51
See application file for complete search history.

(56) References Cited

U.S. PATENT DOCUMENTS

| | | | | | |
|---|---|---|---|---|---|
| 2,631,044 | A | * | 3/1953 | Booth ................. | 280/124.108 |
| 3,253,330 | A | * | 5/1966 | Davies ................ | 29/441.1 |
| 5,609,433 | A | * | 3/1997 | Pazdirek et al. ...... | 403/140 |
| 6,145,181 | A | * | 11/2000 | Murata et al. ........ | 29/450 |
| 6,298,570 | B1 | * | 10/2001 | Maughan et al. ...... | 33/517 |
| 6,746,173 | B1 | * | 6/2004 | Ochiai et al. ........ | 403/137 |
| 6,776,552 | B1 | * | 8/2004 | Marunaka ............ | 403/124 |
| 6,783,136 | B1 | * | 8/2004 | Pronsias Timoney et al. ... | 280/93.511 |
| 6,886,235 | B1 | * | 5/2005 | Suzuki et al. ........ | 29/558 |

FOREIGN PATENT DOCUMENTS

| | | |
|---|---|---|
| JP | 2002-227828 | 8/2002 |
| JP | 2002-227830 | 8/2002 |

* cited by examiner

*Primary Examiner*—Daniel P. Stodola
*Assistant Examiner*—Nahid Amiri
(74) *Attorney, Agent, or Firm*—Browdy and Neimark, PLLC

(57) ABSTRACT

A ball-stud joint having a flange on a stud thereof, the flange having a sloping side for making it easy to locate centrally the stud relatively to a lower die jig. The ball stud is comprised of a ball fit for pivoting movement into a major body, a stud having a plain end adapted to be formed into a rivet head to joint the stud with any counterpart, and a flange formed integrally around the stud to provide a surface coming into abutment against the counterpart. The flange has a sloping side extending radially outwardly from a flat surface facing on to the ball to an outside periphery of the flange in such a way that the sloping side comes into engagement with a slantwise bearing area on a lower die jig when the plain end of the stud is formed into rivet head.

9 Claims, 5 Drawing Sheets

US 7,125,192 B2

JOINT

FIELD OF THE INVENTION

The present invention relates to a joint of a type having a ball stud, termed commonly a ball-stud joint, which is extensively used for any linkages in, for example automobiles, construction machinery, agricultural machinery, packaging equipment, and so on, especially for the linkages in steering/operating systems of automobiles.

BACKGROUND OF THE INVENTION

The joint with ball stud, although having been extensively employed in years for the linkages in automotive vehicles, construction machinery, agricultural machinery, packaging machines, and so on, especially for the linkages in steering/operating systems of automotive vehicles, are needed recently to get further compact or slim in construction, higher in stiffness and easy in assemblage thereof, even with inexpensive in production cost. With the common ball-stud joints, a stud of the ball stud is made with a male or external thread around the plain end thereof. After the stud of the ball stud has passed through any counterpart such as levers, arms and so on to extend above the counterpart, an associated nut having a female thread fits on the male or external thread of the extended stud end whereby the ball stud is connected to the counterpart. Nevertheless, the ball-stud joints especially incorporated in the linkages of the automotive vehicles, since required to assemble them with less expensive cost, are so designed as to fasten the ball stud to the associated counterpart by only means of riveting.

An example of conventional ball-stud joints is shown in FIG. 9. The prior ball-stud joint is envisaged to connect a major body 43 to any counterpart, which could be considered to constitute a first counterpart, including a lever member, arm member and so on through a ball stud 41. To this end, the ball stud 41 has a ball 47 that fits for pivoting movement into a ball socket 50 formed in the major body 43, and also has a rod or stud 45 that extends through a hole 51 in the counterpart 42, which could be considered to constitute a second counterpart, and then comes into engagement by means of riveting an extremity of the stud 45 against the counterpart 42 to joint the ball stud 41 together with the counterpart 42. The stud 45 of the ball stud 41 has a flange 44 that cooperates with the riveted head 46 formed on the plain end of the stud 45 by caulking or riveting to hold the lever member 42 between them. The riveting operation is carried out by hammering or pressing an upper die jig 49 against a lower die jig 48 on which the ball 47 of the ball stud 41 lies, thereby forming the plain end of the stud 45 into the riveted head 46.

Moreover, there is also known a ball-stud joint as shown in FIG. 10. The ball-stud joint is to connect a major body 63 to a counterpart 62 through a ball stud 61 as in the joint illustrated in FIG. 9. A ball 67 of the ball stud 61 fits for pivoting movement into a ball socket 72 formed in the major body 63. A stud 65 extends through a hole 73 in any counterpart 62, followed by coming into connection with the counterpart 62 by riveting a plain end of the stud 65. The stud 65 of the ball stud 61 has a flange 64 that cooperates with the riveted head 66 formed on the plain end of the stud 65 by caulking or riveting to hold the counterpart 62 between them. With the ball stud 61 discussed now, riveting the plain end of the stud 65 is carried out by pressing an upper die jig 69 from above against a lower die jig 68 on which the flange 64 around the stud 65 is carried along an annular shoulder 70, thereby forming the plain end of the stud 65 into the riveted head 66. The stud 65 is made with annular raised portion 74 underneath the flange 64 so as to provide an annular groove 71 between them to hold a dust proof cover, not shown, therein.

A linkage disclosed in, for example Japanese Patent Laid-Open No. 2002-227830 is conventionally known, in which a waterproof boot is first installed between a ball stud and a ball socket prior to fastening a lever to a ball stud to complete a ball-socket joint, and a stud of the ball stud is subjected to riveting with the boot being held between the ball stud and the ball socket, forming a plain end of the stud into an enlarged head. A flanged area around the stud is made in a stepwise construction of relatively large flange and a relatively small flange in such a way that only the large flange is substantially burdened with the load-bearing jig at the time of riveting the stud.

Another connection system of a ball stud to a lever to form a linkage is disclosed in, for example Japanese Patent Laid-Open No. 2002-227828, in which a flanged stud of the ball stud is riveted to form an enlarged head to hold a lever in association with the flange around the stud between them, connecting the lever with the ball stud that fits for pivoting movement into a ball socket. The enlarged head is formed on a plain end of the stud by driving from above a punch against a load-bearing jig, on which a ball of the ball stud lies.

Meanwhile, when connecting any counterpart such as an arm, a lever and so on to a major body with a ball stud where a ball fits into a ball socket in the major body, it is preferable to fasten a ball stud to a counterpart by riveting a stud with a dust proof cover being remained installed over the ball stud.

With the joints of the type illustrated in FIG. 9, nevertheless, it could never be possible to form a riveted head at a plain end of the stud 45 of the ball stud 41 irrespective of any dust proof cover being installed over the ball stud 41, because the ball stud 41 would experience the riveting in a condition the ball 47 lies directly on the lower die jig 48.

With the prior ball-stud joints in FIG. 10 where the ball stud 61 is supported with the lower die jig 68, moreover, the stud 65 is supported with the lower die jig 68 in such a manner that a load-bearing area 70 of the jig 68 comes into engagement with the lower surface 75 of the flange 64 of the ball stud 61. This means that the riveted head 66 could not be formed on a plain end of the stud 65 by hammering with any upper die jig 69, with any dust proof cover being remained installed in the annular groove 71, which is formed to hold the dust proof cover therein.

SUMMARY OF THE INVENTION

The present invention has for its primary object to resolve the major problem as stated earlier in the ball-stud joint in which the ball fits into a ball socket in any major body, and to provide a ball-stud joint in which a stud or rod is allowed to experience riveting to form a rivet head at a plain end of the stud to make connection with any counterpart including a lever, an arm, and so on, irrespective of any dust proof cover being remained installed on the stud. The present invention especially provides a ball-stud joint that is simple in construction and easy to locate the stud centrally on a lower die jig to make the riveting operation easier. Thus, the ball-stud joint of the present invention is compact or slim in construction, high in stiffness and inexpensive in processing cost.

The present invention is concerned with a ball-stud joint composed of a major body and a ball stud connected to the major body, wherein the ball stud is comprised of a ball fit for pivoting movement into a ball socket recessed in the major body, a stud having an end made integrally with the ball and another plain end adapted to be subjected to a riveting operation to joint the stud with any counterpart, and a flange formed integrally around the stud to provide a surface coming into abutment against the counterpart, and wherein the flange has a sloping side extending radially outwardly from a flat surface facing on to the ball to an outside periphery of the flange in such a way that the sloping side comes into engagement with a slantwise bearing area on a lower die jig when the plain end of the stud is formed into rivet head.

In an aspect of the present invention, a ball-stud joint is disclosed in which the sloping side is made in $S \geqq 1.0$ mm and $25° \leqq \theta \leqq 50°$, wherein S denotes a widthwise distance of the flange ranging from the flat surface to a level where the sloping side meets the outside periphery of the flange, and $\theta$ denotes an angle included between the flat surface and the sloping side of the flange.

In another aspect of the present invention, a ball-stud joint is disclosed in which when the angle $\theta$ included between the flat surface and the sloping side is at 45°, the widthwise distance S of the flange ranging from the flat surface to the level where the sloping side meets the outside periphery of the flange is determined to 1.0 mm $\leqq S \leqq$ 2.0 mm. Especially, it is preferred that the widthwise distance S is in a range of 1.2 mm $\leqq S \leqq$ 1.5 mm.

In another aspect of the present invention, a ball-stud joint is disclosed in which the major body is made of steel and has a threaded bore to connect the major body to another counterpart. In a further another aspect of the present invention, there is disclosed a ball-stud joint in which a retainer ring to keep the ball stud in connection with the major body is installed between an opening of the ball socket in the major body and an outside surface of the ball in a way held at the opening in the major body.

In another aspect of the present invention, a ball-stud joint is disclosed in which the ball stud has a retainer made integrally on the stud between the flange and the ball, providing an annular groove between the retainer and the end surface of the flange to fit over an mouth of a dust proof cover.

In another aspect of the present invention, a ball-stud joint is disclosed in which a riveting operation to form a rivet head on the plain end of the stud against the counterpart is carried out while the dust proof cover is remained fit in the groove formed on the stud of ball stud.

In another aspect of the present invention, a ball-stud joint is disclosed in which the flange on the ball stud is made in such configuration that is circular in cross section and raised on the top thereof into a frustum of right circular cone to provide the sloping side.

In a further another aspect of the present invention, there is disclosed a ball-stud joint wherein a riveting tool to form the rivet head on the plain end of the stud is comprised of a lower die jig to hold the stud of the ball stud thereon, and an upper die jig to form the plain end of the stud into the rivet head by direct pressure, the lower die jig being composed of a stationary lower die fastened to a stationary holder, and a movable lower die mounted on a movable holder, and wherein the movable and stationary lower dies have semicircular slantwise bearing halves, one to each die, which are opposed to each other to hold the sloping sides of the stud between them when moved towards one another into cooperation relationship.

With the ball-stud joint constructed as stated earlier, the sloping side of the flange, in other words, the conical side of the flange helps get the stud easily centering with respect to the lower die jig to hold steady the stud on the lower die jig at the time of riveting operation to form the plain end of the stud into a rivet head. That is to say, operation of an actuating lever causes a pair of slantwise bearing halves to approach each other to grasp the stud of the ball stud between them, and in doing so the flange of the stud is supported at the sloping side thereof on the slantwise bearing halves of the lower die jig in such a way that the sloping side of the flange comes into sliding engagement with the slantwise bearing halves of the lower die jig. The sliding engagement of the slantwise bearing halves with the sloping side causes a force that pushes upwards the stud while locating centrally the stud relatively to the slantwise bearing halves. As the slantwise bearing halves are brought closer to each other, the slantwise bearing halves, because their inclination zeros in on the axis of the stud, get easily the stud located centrally to be held steady in the lower die jig. This helps ensure of forming simply the plain end of the stud into the uniform rivet head by direct pressure. Moreover, the lower die jig can hold the stud without any interference with the dust proof cover installed in the annular groove around the stud. This means that the riveting operation applied on the plain end of the stud could be carried out with the dust proof cover being remained fit in the annular groove around the stud.

With the ball-stud joint in which the flange on the stud of the ball stud is made to have the sloping side as recited earlier, the sloping side around the flange helps locate centrally the stud with ease and speed relatively to the lower die jig, making it possible to complete the riveting operation with high efficiency. Chamfering the stud to make the sloping side, moreover, contributes to rendering the ball stud in itself lightweight, making it possible to turn, swivel and pivot the ball stud to transmit smoothly the power with relatively low torque. With the ball-stud joint of the present invention, the sloping side made on the flange of the ball stud, because of allowing to adopt the width of any conventional flange just as it is without making the flange larger in width or height thereof, can be formed around the flange with ease and on the cheap. In addition, the flange having the sloping side is compact or slim in construction and high in stiffness. According to the ball-stud joint of the present invention, since the lower die jig can hold the stud without causing any interference with the dust proof cover, the riveting operation to form the plain end of the stud into the rivet head can be accomplished with the dust proof cover being remained installed in the annular groove around the stud.

The ball stud of the present invention would be shipped and fastened to the counterpart at any user's site with the dust proof cover being remained installed to the ball stud. When the slantwise bearing halves of the lower die jig of the riveting tool come into a sloping engagement with the sloping side of the flange on the stud of the ball stud, the semicircular slantwise bearing halves are allowed to come into sliding engagement with the sloping side of the flange under a wedge action along the sloping side of the flange without undergoing any interference with the dust proof cover remained installed in the annular groove around the ball stud. Thus, the riveting operation to form the plain end of the stud into the rivet head can be smoothly carried out with no possible fear that the slantwise bearing halves bite the lip around the mouth of the dust proof cover, causing any damage to the dust proof cover. According to the present invention, the ball stud connected with the major body is shielded with the dust proof cover at any given time throughout including even the riveting operation, so that any foreign matter such as dirt and dust is prevented from invading into any clearance left.

Other objects and features of the present invention will be more apparent to those skilled in the art on consideration of the accompanying drawings and following specification wherein are disclosed preferred embodiments of the invention with the understanding that such variations, modifications and elimination of parts may be made therein as fall within the scope of the appended claims without departing from the spirit of the invention.

DETAILED DESCRIPTION OF THE PREFERRED EMBODIMENTS

Figure 1:
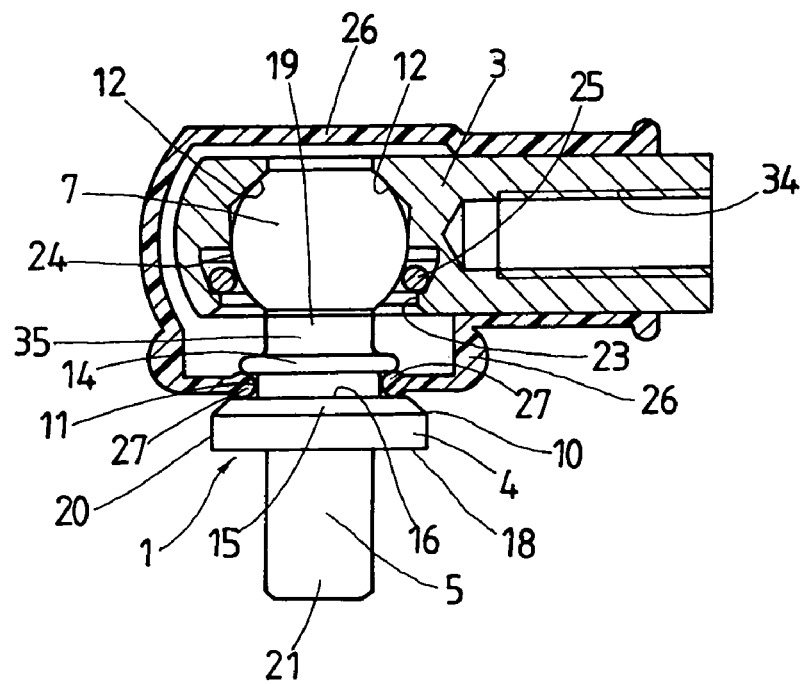
FIG. 1 is an axial cross-sectional view of a preferred embodiment of a ball-stud joint according to the present invention, the view being taken on the plane along the line I—I of FIG. 2.
Figure 2:
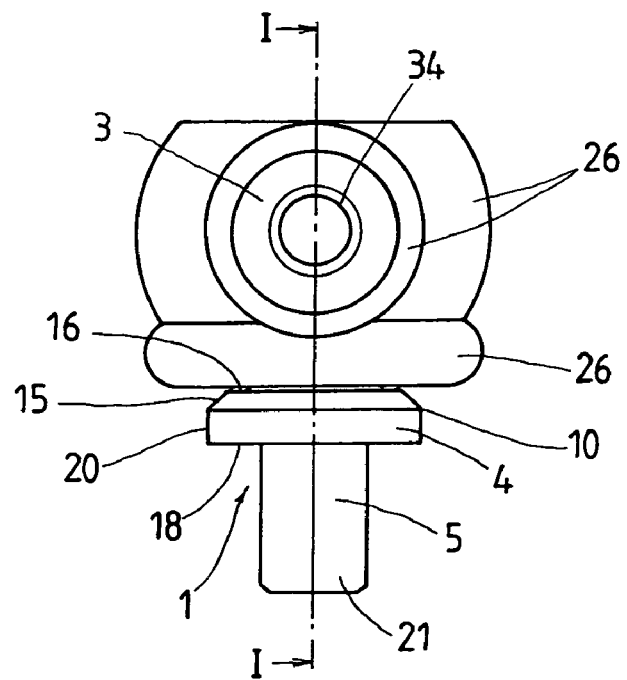
FIG. 2 is an elevation of the ball-stud joint, which is viewed from the right side of FIG. 1.
Figure 3:
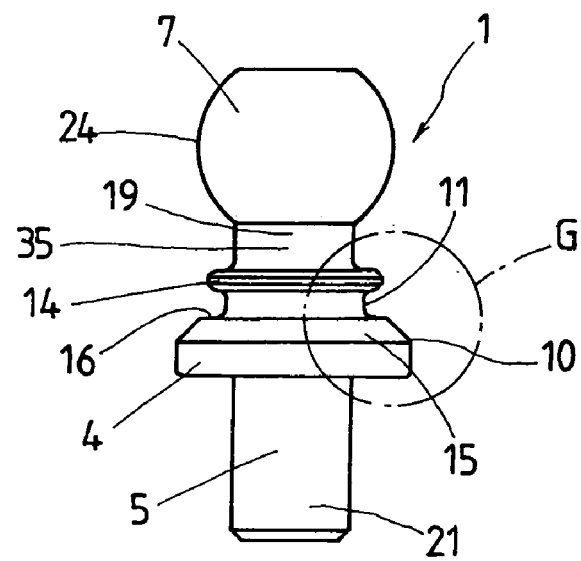
FIG. 3 is an elevation showing a ball stud used in the joint of FIG. 1.

A preferred embodiment of a ball-stud joint according to the present invention will be explained below with reference to the accompanying drawings. The ball-stud joint of the present invention is of the type having a self-centering spherical bearing used commonly for any linkage in, for example automotive vehicles, heavy vehicles, agricultural machinery, packaging equipment, and so on. The embodiment of the present invention discussed later is well suitable for the ball-stud joint used in the steering linkage system of automotive vehicles.

The joint of the present invention is of the type comprised of a ball stud 1 having at one end thereof a spherical bearing that fits into a major body 3 while at the other end thereof to be connected to any counterpart 2, constituting a second counterpart. The ball stud 1 extends in a direction normal to an axial direction of the major body 3, and is allowed to not only turn but also swivel or pivot in and out relatively to the major body 3. The ball stud 1 includes a ball 7 that fits for pivoting movement into a ball socket 12 in the major body 3, a stud or rod 5 having one end 19 merging integrally into the ball 7 and the opposite end 21 terminating into a plain end that will undergo any riveting operation into a riveted head 6 to fasten the stud 5 to any counterpart 2, and an annular flange 4 integral to the stud 5 to provide an abutment 18 against which the counterpart 2 can come into engagement. The stud 5, moreover, has a necked area 35 close to the ball 7 and less in diameter than the ball 7, a retainer 14 made larger in diameter than the necked area 35 to keep a mouth of opening 27 of a dust proof cover 26 in place, and an annular groove 11 into which the mouth 27 of the dust proof cover 26 fits firmly.

The major body 3 is made therein with the ball socket 12 into which the ball 7 of the ball stud 1 fits to make it possible to cause the ball stud 1 to pivot relatively to the major body 3. A retainer ring 25 is installed in an ingress port 23 of the ball socket 12 to surround an outside surface 24 of the ball 7 to make sure of connection of the ball stud 1 with the major body 3. The ball 7 of the ball stud 1 fits into the ball socket 12 in the major body 3 through the ingress port 23 while the retainer ring 25 is arranged to keep the ball stud 1 against falling away from the major body 3 and further bear the load. The major body 3, ball stud 1 and retainer ring 25 are all made of steel. Especially, the major body made of steel rather than aluminum alloys is made large in stiffness, in load resistant against falling away and also in strength resistant against bending. Besides the ball socket 12 made open in the direction normal to the axial direction of the major body 3, there is provided a threaded hole 34 in the major body 3, which extends axially to be opened to any one of the axially opposed ends to connect the major body 3 to a first counterpart, not shown, such as any rod.

With the ball-stud joint constructed as stated earlier, the stud 5 of the ball stud 1 extends through a hole 13 in the counterpart 2 to an extent that a surface 39 of the counterpart 2 comes into face-to-face engagement with an abutment 18 of the flange 4 around the stud 5, followed by undergoing a riveting operation to make a plain end 21 of the stud 5 into a head 6, fastening the ball stud 1 to the counterpart 2. The ball-stud joint of the present invention is envisaged to make it possible to hammer the plain end 21 of the stud 5 into the riveted head against the counterpart 2, irrespective of the dust proof cover 26 being remained installed in the annular groove 11 recessed around the stud 5 of the ball stud 1.

Figure 7:
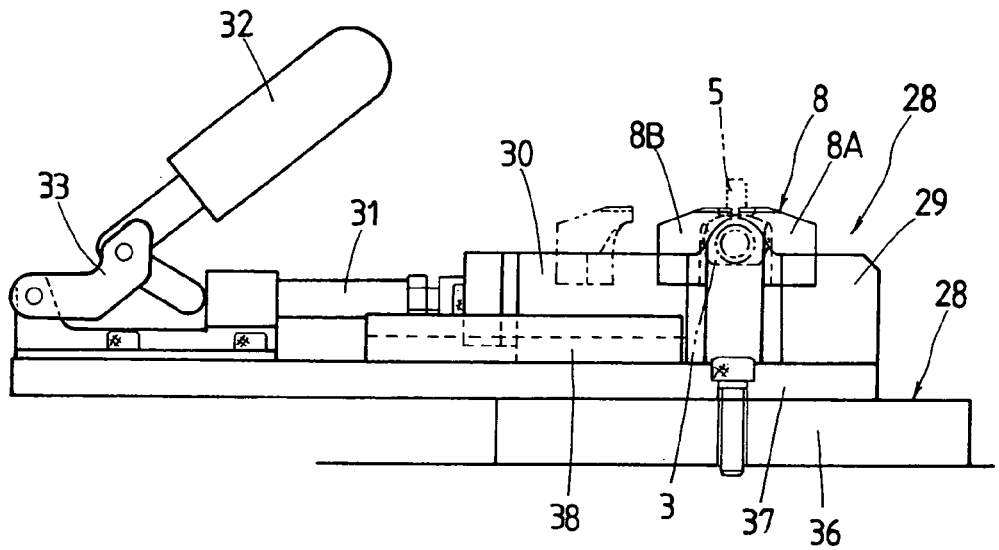
FIG. 7 is an elevation showing a lower die jig used when the stud of the ball stud undergoes the riveting operation for the provision of the ball-stud joint according to the present invention.
Figure 8:
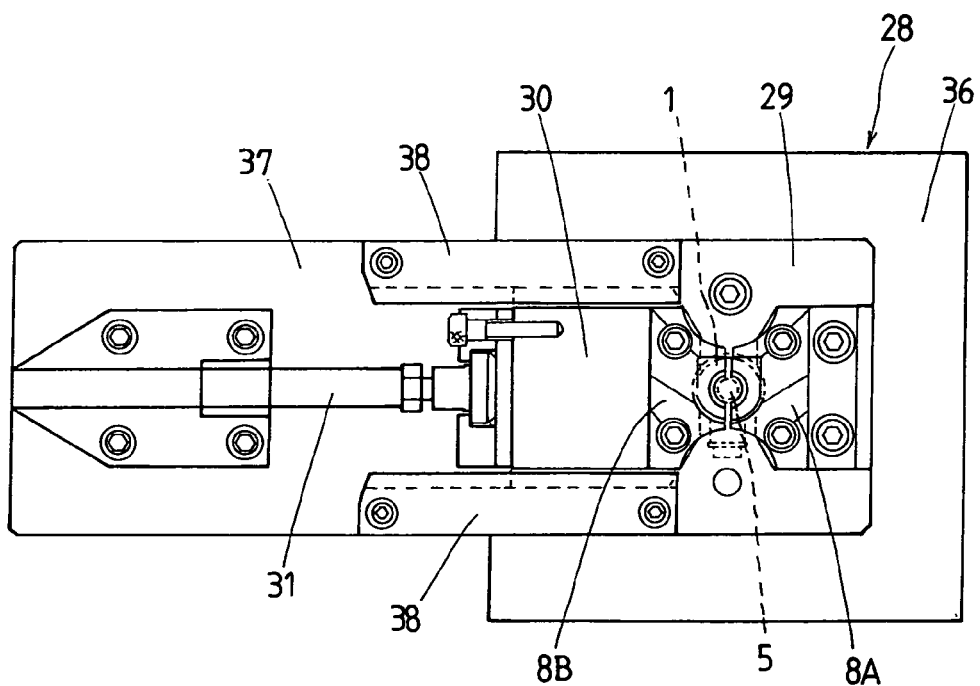
FIG. 8 is a top view of the lower die jig of FIG. 7.
Figure 9:
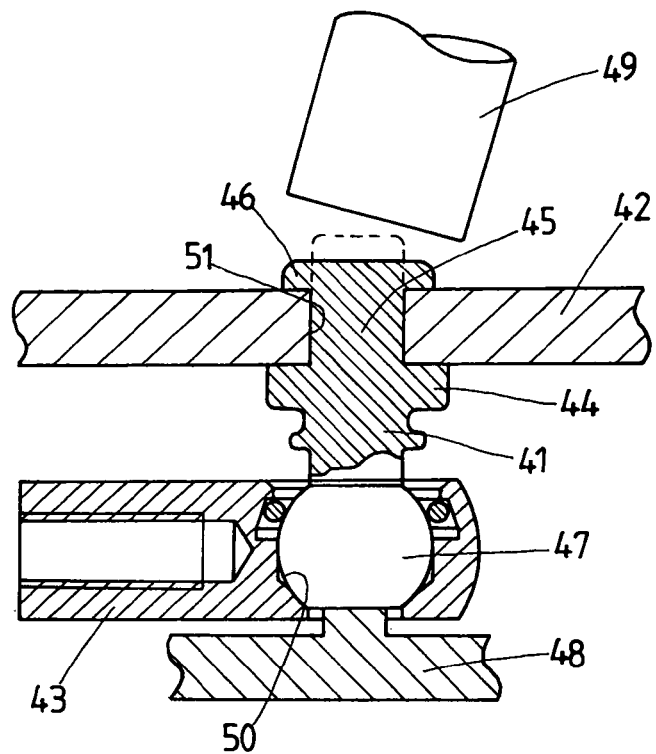
FIG. 9 is a sectioned view illustrating an example of riveting operations carried out for the conventional ball-stud joint.
Figure 10:
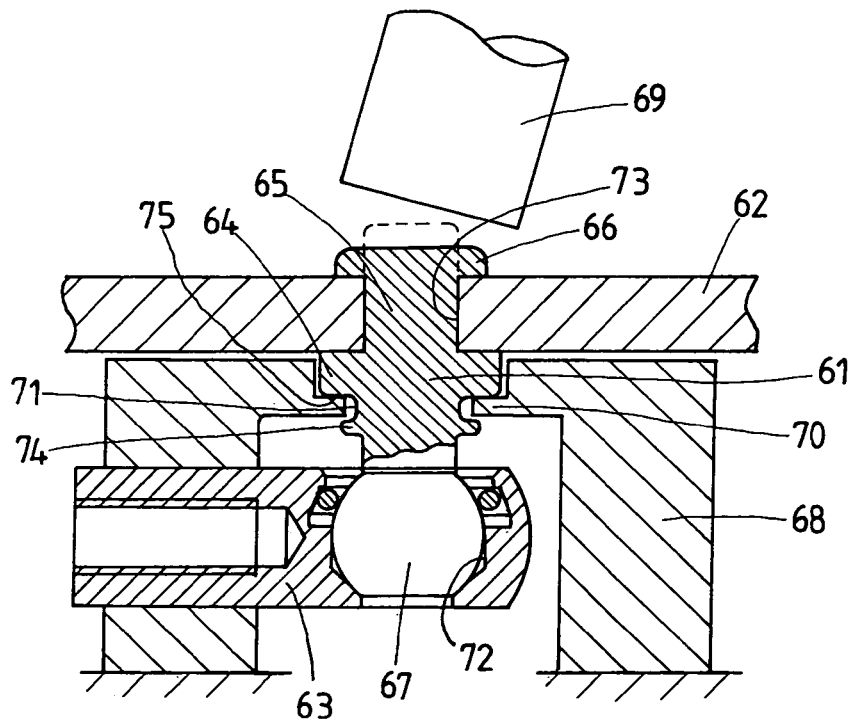
FIG. 10 is a sectioned view illustrating another example of riveting operations carried out for the conventional ball-stud joint.

The ball-stud joint of the present invention features the provision of a tapered or slantwise surface 10 on the flange 4 in preparation for riveting operation. More particular, the surface 10 of the flange 4 on to the ball 7 features a sloping side 15 extending radially outwardly from a central flat area 16 to an outside periphery 20 of the flange 4. In other words, the flange 4 on the ball stud 1 is made in such configuration that is circular in cross section and raised on the top thereof into a frustum of right circular cone. The sloping circular side 15 in the top surface 10 of the flange 4 serves for getting the stud 5 centering or locating centrally relatively to a lower die jig 8 as shown in FIGS. 7 and 8, which is used in any riveting operation to form a riveted head on the plain end 21 of the stud 6.

Figure 4:
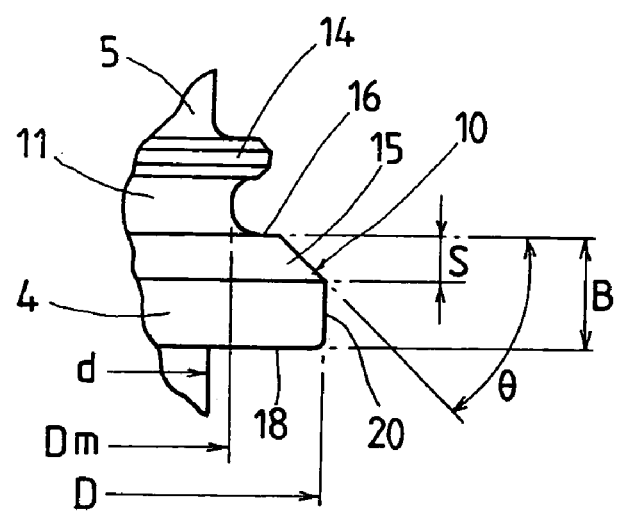
FIG. 4 is a fragmentary enlarged view illustrating an area encircled with G in FIG. 3.
Figure 5:
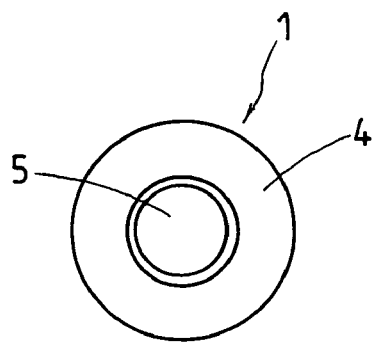
FIG. 5 is a bottom view showing the ball stud of FIG. 3.

With the raised top surface 10 of the flange 4 as shown in FIG. 4, now assuming an angle included between the central flat surface 16 and the sloping side 15 of the flange 4 is referred to θ, a thickness or width of the flange 4 is referred to B, a widthwise distance of the flange 4 ranging from the central flat surface 16 to a level where the slantwise area 15 meets the peripheral surface 20 of the flange 4, or a difference in elevation of the slantwise area 15, is referred to S, an outside diameter of the necked area 35 is referred to Dm, an outside dimension of the flange 4 is referred to D, and an outside diameter of the stud 5 is referred to d, it was verified that the stud 5 was surely held on a slantwise bearing area 17 of the lower die jig 8 at least S≧1.0 mm. Meanwhile, it was identified that the angle θ of the sloping side 15 of the raised top surface 10 was sufficient when lying in the range of 25°≦θ≦50°. If the angle θ were less than 25°, the annular groove 11 to fit over the mouth 27 of the dust proof cover 26 would adversely become too enlarged to keep securely the mouth 27 of the dust proof cover 26 in place. In contrast, if the angle θ were more than 50°, the stud 5 could not be held securely because of the lower die jig 8 being split into two halves of a stationary lower die half 8A and a movable lower die half 8B. In addition, when the difference S in elevation of the slantwise area 15 is less than 1 mm (C 1.0) while the chamfered angle θ of the sloping side 15 on the raised top surface 10 is determined at 45°, the raised top surface 10 would result in becoming too small in dimension to provide the bearing surface, raising a possible problem that the slantwise bearing area 17 of the lower die jig 8 might undergo any deformation.

By the way of contrast, even if the difference S in elevation of the chamfered sloping side 15 is more than 2 mm (C 2.0) even with the chamfered angle θ of the sloping side 15 on the raised top surface 10 being set at 45°, the annular groove 11 to fit over the dust proof cover 26 would become too enlarged to keep securely the mouth 27 of the dust proof cover 26 in place. The maximum dimension allowable for raised top surface 10 on the ball stud 1, although tolerated whenever the annular groove to fit over the dust proof cover 26 is kept against made enlarged, may be practically determined to an appropriate dimension depending on the outside diameter and the width or height B, refer to FIG. 4, of the flange 4. Thus, the flange 4 around the ball stud of the present invention is designed to have the sloping side 15 that will satisfy the relations: S≧1.0 mm and 25°≦θ≦50°. Especially, the sloping side 15 of the flange 4 is made in the range of 1.0 mm ≦S≦2.0 mm in case where the angle of the sloping side 15 on the raised top surface 10 is set at 45°.

Figure 6:
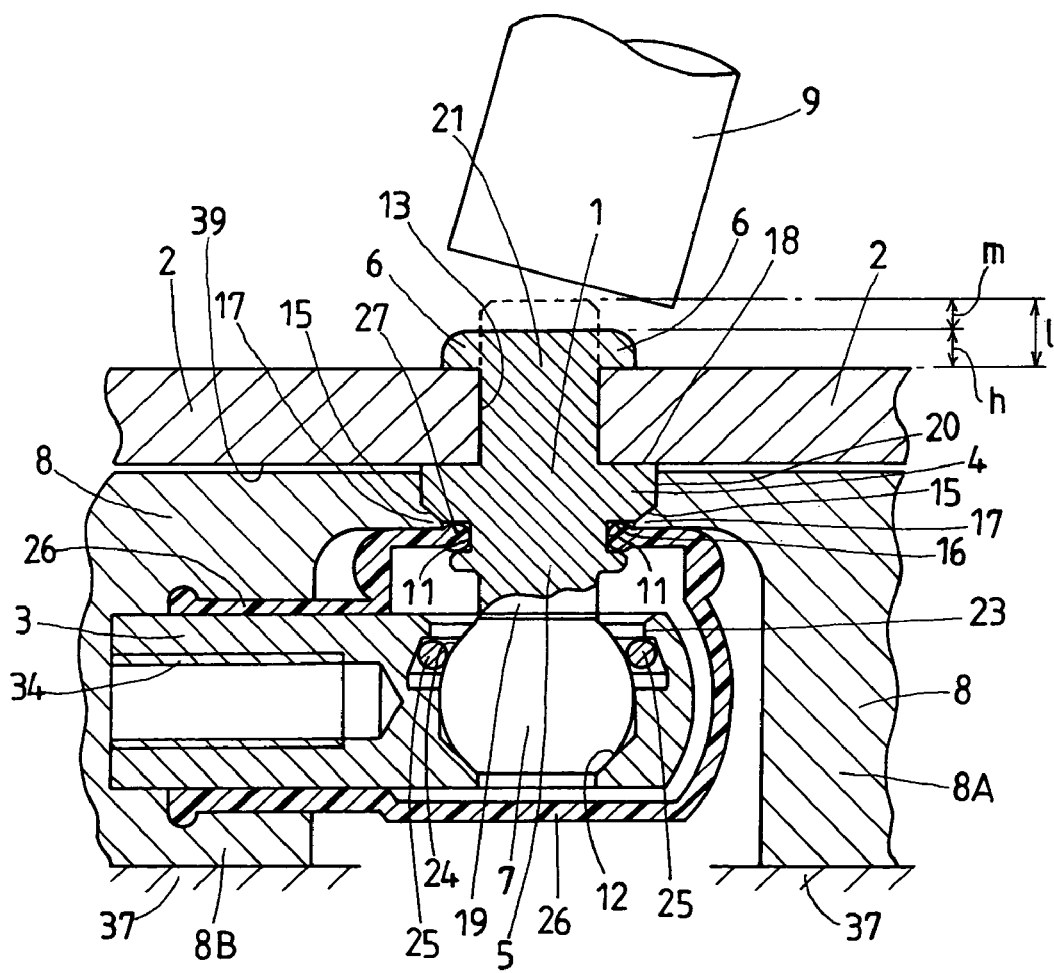
FIG. 6 is a sectioned view, partly broken away, explaining how to carry out riveting operation on a plain end of the stud of the ball stud irrespective of a dust proof cover being remained installed there.

With the ball-stud joint of the present invention, moreover, the width S in the flange 4 is preferably in an appropriate range of 1.2 mm ≦S≦1.5 mm. For making sure of better riveting the plain end 21 of the stud 5, it is recommended that the ball-stud joint has the dimensions of D=12 mm, Dm=7 mm, B=3 mm, θ=45° and S=1.2. Now assuming in FIG. 6 that a length of the stud 5 above the grip is referred to 1, an amount squeezed down is referred to m, and an height of a rivet head is referred to h, the riveting operation was carried out for 1=3.0 mm, h=1.3 mm, m=1.7 mm and d=6.0.

With the ball-stud joint of the present invention, the raised top surface 10 made on the flange 4 around the ball stud 1, because of allowing to adopt the width of any conventional flange just as it is without making the flange larger in width or height thereof, makes it possible to form the sloping side 15 on the flange 4 with ease and on the cheap. In conventional ball studs, the width S of the flange is used to be 0.5 mm (namely, C 0.5) when the edge of the flange is chamfered at 45° (C). With the ball stud of the present invention, in contrast, the raised top surface 10 of the flange 4 makes it possible to ensure the width S not less than 1.0 mm, for example 1.2 mm, or the dimension not less than C 1.0 at the chamfered angle θ of 45°. This dimension of the width S is sufficient to help better riveting operation in which the raised top surface 10 is held steady even on the lower die jig 8 composed of the stationary die half 8A and the movable die half 8B.

The ball stud 1 is provided integrally around thereof with the retainer 14 that are disposed between the flange 4 and the ball 7 in a way adjacent to the flange 4 on one side thereof while continuing the necked area 35 on the other side thereof, thereby forming the annular groove 11 in association with the central flat surface 16 of the flange 4 to hold therein the mouth 27 of the dust proof cover 26. With the retainer 14 constructed around the stud 5 of the ball stud 1 as stated earlier, the dust proof cover 26 fits into the annular groove 11 to be held in place on the stud 5 of the ball stud 1. The dust proof cover 26 fits into the annular groove 11 along the mouth 27 thereof to enclose the overall area ranging from the joint of the ball 7 of the ball stud 1 with the major body 3 to the remote portion nearing the opposite end, thereby keeping the whole joint against contamination by dust and moisture, and also lubricant or grease leakage. The dust proof cover is generally made of any synthetic rubber allowing the ball stud 1 and the major body 3 to move with smooth relatively to one another.

The riveting tool, as shown in FIGS. 7 and 8, is mainly composed of a lower die jig 8 to hold the stud 5 of the ball stud 1 thereon, and an upper die jig 9 to form the plain end 21 of the stud 5 into a rivet head 26 by direct pressure. A lower jig fixture 28 to support the riveting tool thereon is comprised of a machine bed 36, a platform 37 mounted on the machine bed 36, a stationary holder 29 fastened to the platform 37, a movable holder 30 supported on the platform 37 to move towards and away from the stationary holder 29 between and along the sidewise opposing guide rails 38, and an actuating lever 32 to drive the movable holder 30 towards and away from the stationary holder 29 between and along the sidewise opposing guide rails 38 through a pusher 31. The lower die jig 8 is made up of the lower die half 8A fastened to the stationary holder 29 and the lower die half 8B movable together with the movable holder 30. Both the movable and stationary lower die halves 8A and 8B have semicircular slantwise bearing halves 17, one to each half, which are opposed to each other to hold the raised top surface 10 of the stud 5 between them when moved towards one another into cooperation relationship. The semicircular slantwise bearing halves 17 of the movable and stationary lower die halves 8A and 8B are each made at their circular edges in a wedge in radially cross section, which is instrumental in bringing the slantwise bearing halves 17 along the sloping side 15 of the flange 4 on the stud 5 into clamping engagement with the stud 5 without causing any interference with the dust proof cover 27 or any damage to the dust proof cover 27 when the slantwise bearing halves 17 of the lower die jig 8 are moved towards one another.

To hold properly the raised top surface 10 of the stud 5 on the slantwise bearing halves 17 of the lower die jig 8, the stud 5 of the ball stud 1 is first placed between and above the slantwise bearing halves 17 of the lower die jig 8, which are retreated away from each other. Then, the actuating lever 32 is operated to force the pusher 32 via a linkage 33 to move the movable lower die half 8B towards the stationary holder 29 to press ahead the slantwise bearing area 17 of the movable lower die half 8B to the central flat surface 16 of the flange 4 on the stud 5, thereby bringing the slantwise bearing halves 17 into sliding engagement with the sloping side 15 on the flange 4 of the stud 5. The sliding engagement of the slantwise bearing halves 17 with the sloping side 15 causes a force that pushes upwards the stud 5 while locating centrally the stud 5 relatively to the slantwise bearing halves 17. That is to say, as the slantwise bearing half 17 on the movable lower die half 8B is forced towards the counterpart or the slantwise bearing half 17 on the stationary lower die half 8A, the slantwise bearing halves 17, because their inclination zeros in on the axis of the stud 5, get easily the stud 5 located centrally to be held steady in the lower die jig 8. This helps ensure of forming simply the plain end 21 of the stud 5 into the uniform rivet head 6 by direct pressure.

With the ball-stud joint constructed as recited earlier, the flange 4 is supported at the raised top surface 10 thereof on the slantwise bearing halves 17 of the lower die jig 8 in a sloping engagement with one another in a way the bearing force zeros in on the axis of the stud 5, thereby keeping steady the stud 5 of the ball stud 1 on the lower die jig 8. On assembly of the ball-stud joint of this invention, the retainer ring 25 of, for example a split ring of C-type is first fit around an opening of a ball socket 12 recessed in the major body 3. Then, the ball 7 of the ball stud 1 is thrust into the ball socket 12 of the major body 3 while pushing away radially the split ring 25. The retainer ring 25, after the ball 7 has fit snugly into the ball socket 12, shrinks radially into the original state, thereby keeping the ball stud 1 against falling away from the major body 3.

What is claimed is:

1. A ball-stud joint composed of a major body having a threaded bore adapted to connect the major body to a first counterpart, a ball stud connected to the major body, and a dust cover installed to prevent entry of dust where the major body is connected to the ball stud, wherein the ball stud is comprised of a ball fit for pivoting movement into a ball socket recessed in the major body, a stud having an end made integrally with the ball and another end adapted to fit into a second counterpart to joint the stud with the second counterpart, and a flange formed integrally around the stud to provide a surface coming into abutment against the second counterpart, and wherein the flange has a flat surface facing toward the ball and a sloping side extending radially outwardly from the flat surface to an outside periphery of the flange in such a way that the sloping side can come into engagement with a slantwise bearing area on a lower die jig while the dust cover remains installed during a riveting operation performed on the other end of the stud.

2. A ball-stud joint constructed as defined in claim 1, wherein the sloping side is made in $S \geq 1.0$ mm and $25° \leq \theta \leq 50°$, in which S denotes a widthwise distance of the flange ranging from the flat surface to a level where the sloping side meets the outside periphery of the flange, and $\theta$ denotes an angle included between the flat surface and the sloping side of the flange.

3. A ballstud joint constructed as defined in claim 1, wherein when the angle $\theta$ included between the flat surface and the sloping side is at 45°, the widthwise distance S of the flange ranging from the flat surface to the level where the sloping side meets the outside periphery of the flange is determined to 1.0 mm $\leq S \leq 2.0$ mm.

4. A ballstud joint constructed as defined in claim 3, wherein the widthwise distance S is preferably in a range of 1.2 mm $\leq S \leq 1.5$ mm.

5. A ballstud joint constructed as defined in claim 1, wherein the major body is made of steel.

6. A ball-stud joint constructed as defined in claim 1, wherein a retainer ring to keep the ball stud in connection with the major body is installed between an opening of the ball socket in the major body and an outside surface of the ball in a way held at the opening in the major body.

7. A ballstud joint constructed as defined in claim 1, wherein the ball stud has a retainer made integrally on the stud between the flange and the ball, providing an annular groove between the retainer and the end surface of the flange to fit over a mouth of the dust proof cover.

8. A ballstud joint constructed as defined in claim 1, wherein the flange on the ball stud is made in such configuration that is circular in cross section and raised on the top thereof into a frustum of a right circular cone to provide the sloping side.

9. A ballstud joint constructed as defined in claim 1, wherein the stud further has an annular groove that is bounded by the flat surface and into which a mouth of the dust proof cover is fitted.

* * * * *